United States Patent [19]

Lund

[11] Patent Number: 4,604,374

[45] Date of Patent: Aug. 5, 1986

[54] CATALYST PREPARED FROM ORGANOMAGNESIUM COMPOUND, EPIHALOHYDRIN REDUCING HALIDE SOURCE AND TRANSITION METAL COMPOUND

[75] Inventor: Gary K. Lund, Baton Rouge, La.

[73] Assignee: The Dow Chemical Company, Midland, Mich.

[21] Appl. No.: 420,443

[22] Filed: Sep. 20, 1982

[51] Int. Cl.$^4$ ............................ C08F 4/02; C08F 10/00
[52] U.S. Cl. .................................... 502/115; 502/118; 502/119; 502/125
[58] Field of Search ........... 252/429 B, 429 C, 431 R; 526/124, 143; 502/115, 118, 119

[56] References Cited

U.S. PATENT DOCUMENTS

| | | | |
|---|---|---|---|
| 3,644,318 | 2/1972 | Diedrich et al. | 260/88.2 |
| 3,901,863 | 8/1975 | Berger et al. | 526/124 |
| 3,917,575 | 11/1975 | Matsuura et al. | 260/88.2 |
| 3,951,935 | 4/1976 | Engelmann | 526/129 |
| 4,039,472 | 8/1977 | Hoff | 252/429 |
| 4,085,276 | 4/1978 | Toyota et al. | 526/122 |
| 4,105,846 | 8/1978 | Hoff et al. | 526/124 |
| 4,115,319 | 9/1978 | Scata et al. | 252/429 |
| 4,199,473 | 4/1980 | Timms | 526/138 |

FOREIGN PATENT DOCUMENTS

| | | |
|---|---|---|
| 0000007 | 12/1978 | European Pat. Off. . |
| 2758312 | 7/1978 | Fed. Rep. of Germany . |
| 51-111281 | 10/1976 | Japan . |
| 51-148785 | 12/1976 | Japan . |
| 56-11910 | 2/1981 | Japan . |
| 762246 | 3/1977 | South Africa . |
| 1275641 | 12/1969 | United Kingdom . |
| 1235062 | 6/1971 | United Kingdom . |
| 1306001 | 2/1973 | United Kingdom . |
| 1311013 | 3/1973 | United Kingdom . |
| 1538472 | 1/1979 | United Kingdom . |
| 1539175 | 1/1979 | United Kingdom . |

*Primary Examiner*—Edward J. Smith
*Attorney, Agent, or Firm*—J. G. Carter

[57] ABSTRACT

A catalyst for polymerizing olefins is the product resulting from heating in an inert hydrocarbon diluent a mixture of (A) an organomagnesium material, (B) an epihalohydrin, (C) a reducing halide source and (D) a transition metal compound.

4 Claims, No Drawings

CATALYST PREPARED FROM ORGANOMAGNESIUM COMPOUND, EPIHALOHYDRIN REDUCING HALIDE SOURCE AND TRANSITION METAL COMPOUND

BACKGROUND OF THE INVENTION

This invention relates to a new catalyst composition useful for initiating and promoting polymerization of one or more α-olefins and to a polymerization process employing such a catalyst composition.

It is well known that olefins such as ethylene, propylene, and 1-butene in the presence of metallic catalysts, particularly the reaction products of organometallic compounds and transition metal compounds can be polymerized to form substantially linear polymers of relatively high molecular weight. Typically such polymerizations are carried out at relatively low temperatures and pressures.

Among the methods for producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups 4b, 5b, 6b and 8 of Mendeleev's Periodic Table of Elements with an organometallic compound. Generally the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, the polymerization is carried out in a reaction medium comprising an inert organic liquid, e.g., an aliphatic hydrocarbon and the aforementioned catalyst. One or more olefins may be brought into contact with the reaction medium in any suitable manner, and a molecular weight regulator, such as hydrogen, is often added to the reaction vessel in order to control the molecular weight of the polymers. Such polymerization processes are either carried out at slurry polymerization temperatures (i.e., wherein the resulting polymer is not dissolved in the hydrocarbon reaction medium) or at solution polymerization temperatures (i.e., wherein the temperature is high enough to solubilize the polymer in the reaction medium).

Following polymerization, it is common to remove catalyst residues from the polymer by repeatedly treating the polymer with alcohol or other deactivating agent such as an aqueous basic solution. Such catalyst deactivation and/or removal procedures are expensive both in time and material consumed as well as the equipment required to carry out such treatment.

Gessell's U.S. Pat. Nos. 4,244,838 and 4,246,383 and pending applications Ser. No. 192,959 filed Oct. 1, 1980, now U.S. Pat. No. 4,496,660, and Ser. No. 192,960 filed Oct. 1, 1980, now abandoned, by Gessell, Gibbs and Fuentes, Jr., disclose catalysts prepared by employing an organic hydroxyl-containing material. However, such catalysts are directed only to the resultant solid reaction product which must be separated from the liquid portion and washed. It would be desirable to employ a catalyst which does not require the recovery of the solid reaction product and the attendant washing steps.

The present invention provides a catalyst for polymerizing α-olefins which catalysts are sufficiently efficient so as to not require their removal from the polymer and their preparation does not require recovery and washing of the solid reaction product.

SUMMARY OF THE INVENTION

The present invention is directed to a catalytic product resulting from admixing in an inert hydrocarbon diluent and in an atmosphere which excludes moisture and oxygen (A) at least one hydrocarbon soluble organomagnesium material;
(B) at least one epihalohydrin;
(C) at least one reducing halide source; and
(D) at least one transition metal (Tm) compound; and wherein
  (1) the components are added in the order (A), (B), (C) and (D) or (A), (B), (D) and (C); and
  (2) the components are employed in quantities so as to provide the following atomic ratios
    Mg:Tm of from about 0.1:1 to about 100:1, preferably from about 1:1 to about 40:1 and most preferably from about 5:1 to about 20:1;
    Cl (from Component C):Mg of from about 2:1 to about 20:1, preferably from about 3:1 to about 15:1 and most preferably from about 4:1 to about 12:1; and
    the epoxide:total number of hydrocarbyl groups attached to a metal atom in component (A) is from about 0.5:1 to about 2:1 and preferably from about 0.5:1 to about 1.5:1; and
  (3) the proviso that when the halide (from Component C):Mg atomic ratio is less than about 3:1, then the resultant mixture is heated at a temperature of from about 35° C. up to the boiling point of the inert hydrocarbon diluent, preferably from about 50° C. to about 70° C., for a time to permit substantial reaction of the resultant mixture as indicated by a change in color of the mixture.

A further aspect of the invention is a process for polymerizing α-olefins or mixtures thereof which comprises conducting the polymerization in the presence of the aforementioned catalysts.

DESCRIPTION OF THE PREFERRED EMBODIMENTS

The organomagnesium materials which are suitably employed in the present invention include those represented by the formula $R_2Mg.xMeR'_{x'}$ wherein each R is independently a hydrocarbyl group and each R' is independently a hydrogen, hydrocarbyl or hydrocarbyloxy group, Me is Al, Zn or B, x has a value from 0 to 10 and x' has a value equal to the valence of Me.

The term hydrocarbyl as employed herein refers to a monovalent hydrocarbon group such as alkyl, cycloalkyl, aryl, aralkyl, alkenyl and similar hydrocarbon groups having from 1 to about 20 carbon atoms with alkyl having from 1 to 10 carbon atoms being preferred.

The term hydrocarbyloxy as employed herein refers to monovalent oxyhydrocarbon group such as alkoxy, cycloalkoxy, aryloxy, aralkoxy, alkenoxy and similar oxyhydrocarbon groups having from 1 to about 20 carbon atoms with alkoxy groups having from 1 to 10 carbon atoms being the preferred hydrocarbyloxy groups.

The quantity of $MeR'_x$, i.e. the value of x, is preferably the minimum amount which is sufficient to render the magnesium compound soluble in the inert solvent or diluent which is usually a hydrocarbon or mixture of hydrocarbons. The value of x therefore is from zero to about 10, usually from about 0.01 to about 2.

Particularly suitable organomagnesium compounds include, for example, di-(n-butyl) magnesium, n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-(n-octyl) magnesium, butyl octyl and such complexes butyl ethyl magnesium.0.5 triisobutylaluminum, as di-n-butyl magnesium.⅓ aluminum triethyl, di-(n-butyl) magnesium.1/6 aluminum triethyl, mixtures thereof and the like.

Suitable epihalohydrins include, those represented by the formula

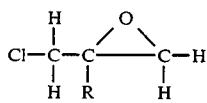

wherein R is hydrogen or an alkyl group having from 1 to about 10 carbon atoms. Particularly suitable epihalohydrins include, for example, epichlorohydrin, epibromohydrin, epiiodohydrin, methylepichlorohydrin, methyleipbromohydrin, methylepiiodohydrin, ethylepichlorohydrin, ethylepibromohydrin, ethylepiiodohydrin, mixtures thereof and the like.

Suitable reducing halide sources include those represented by the formulas

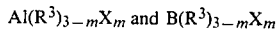

including mixtures thereof wherein each $R^3$ is independently hydrogen or a hydrocarbyl group as hereinbefore defined, and m has a value from 1 to 2.

Particularly suitable reducing halides include, for example, ethylaluminum dichloride, diethylaluminum chloride, ethylaluminum sesquichloride, ethylboron dichloride, diethylboron chloride, mixtures thereof and the like.

Suitable transition metal compounds which can be employed include those represented by the formula $TmY_nX_{z-n}$, wherein Tm is a transition metal in its highest stable valence state and being selected from groups IV-B, V-B and VI-B of the Periodic Table of the Elements; Y is oxygen, OR" or $NR_2$"; R" is hydrogen or a hydrocarbyl group having from 1 to about 20 carbon atoms; X is a halogen, preferably chlorine or bromine; z has a value corresponding to the valence of the transition metal, Tm; n has a value of from zero to 5 with the value of z-n being from zero up to a value equal to the valence state of the transition metal, Tm.

Particularly suitable transition metal compounds include, for example, titanium tetrachloride, titanium tetrabromide, dibutoxy titanium dichloride, monoethoxy titanium trichloride, isopropoxytitanium trichloride, tetra-n-propoxytitanium, tetraisopropoxytitanium, tetra-n-butoxytitanium, chromyl chloride, vanadium oxytrichloride, zirconium tetrachloride, tetrabutoxyzirconium, vanadium tetrachloride, mixtures thereof and the like.

Suitable organic inert diluents in which the catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane, dimethylcyclohexane, dodecane, eicosane industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Suitable cocatalysts or activators with which the catalysts of the present invention can be reacted, contacted or employed in the polymerization of α-olefins includes those aluminum, boron, zinc or magnesium compounds represented by the formulas $Al(R^3)_{3-a}X'_a$, $B(R^3)_{3-a}X'_a$, $MgR^3_2$, $MgR^3X'$, $ZnR^3_2$ or mixtures thereof wherein $R^3$ is as previously defined; X' is a halogen, preferably chlorine or bromine; and a has a value of from zero to 2, preferably zero to 1 and most preferably zero.

Other suitable cocatalysts or activators include those aluminum, boron, zinc or magnesium compounds represented by the general formulas $(R^3_{2-a}X'_aAl)_2Z$, $(R^3Zn)_2Z$, $(R^3_{2-a}X'_aB)_2Z$, $(R^3Mg)_2Z$ or mixtures thereof, wherein $R^3$ is as previously defined; X' is a halogen and Z is a bridging atom, typically oxygen, sulfur or nitrogen. The subscript a has a value of from zero to one, preferably zero.

Particularly suitable cocatalysts or activators include, for example, diethylaluminum chloride, ethylaluminum dichloride, diethylaluminum bromide, triethylaluminum, triisobutylaluminum, diethylzinc, dibutylmagnesium, butylethylmagnesium, butylmagnesium chloride, diisobutylaluminum hydride, isoprenylaluminum, triethylboron, trimethylaluminum, aluminum diisobutyloxide, mixtures thereof and the like.

The cocatalysts or activators are employed in quantities such that the atomic ratio of the Al, B, Mg, Zn or mixtures thereof to Tm is from about 0.1:1 to about 1000:1, preferably from about 5:1 to about 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic α-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with one or more other α-olefins and/or with small amounts i.e., up to about 25 weight percent based on the polymer of other polymerizable ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50 weight percent, especially from about 0.1 to about 40 weight percent of propylene, butene-1, hexene-1, octene-1, 4-methylpentene-1, 1,7-octadiene or similar α-olefin or α-diolefin based on total monomer.

In the polymerization process employing the aforementioned catalytic reaction product, polymerization is effected by adding a catalytic amount of the catalyst composition to a polymerization zone containing α-olefin monomer, or vice versa. The polymerization zone is maintained at temperatures in the range from about 0° to about 300° C., preferably at slurry polymerization temperatures, e.g., from about 0° to about 95° C., more preferably from about 50° to about 90° C., for a residence time of from about 15 minutes to about 24 hours, preferably from about 30 minutes to about 8 hours. It is generally desirable to carry out the polymerization in the absence of moisture and oxygen and a catalytic amount of the catalytic reaction product is generally within the range from about 0.0001 to about 0.1 milligram-atoms transition metal per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally, in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 10 to about 500 psig. However, polymerization within the scope of the present invention can occur at pressures from atmospheric up to pressures determined by the capabilities of the polymerization equipment. During polymerization it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present and thus remove the heat of reaction. In any event, adequate means should be provided for dissipating the exothermic heat of polymerization, e.g., by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the melt index values $I_2$ and $I_{10}$ were determined by ASTM D-1238 conditions E and N respectively. The apparent bulk density was determined as an unsettled bulk density according to the procedure of ASTM 1895 employing a paint volumeter from the Sargent-Welch Scientific Company (catalog no. S-64985) as the cylinder instead of the one specified by the ASTM procedure.

GENERAL PROCEDURE

In each of the following examples, the catalyst components were blended while in a gloved box filled with nitrogen unless otherwise indicated. In the examples, the butylethylmagnesium was a commercial material obtained from Texas Alkyls Corporation, the dihexylmagnesium was a commercial material obtained from Ethyl Corporation, triisobutylaluminum, triethylaluminum, diethylaluminum chloride, and ethylaluminum dichloride were all commercial materials obtained from Texas Alkyls Corporation. All ratios are molar ratios unless otherwise indicated.

EXAMPLE 1

A. Catalyst Preparation 4.1 milliliters (50 mmoles) of neat epichlorohydrin were slowly added to a stirred solution of 39.2 ml (25 mmoles) of 0.637 molar butylethylmagnesium in hexane. Titanium tetrachloride (0.28 ml, 2.5 mmoles) was added dropwise to the resultant solution with continuous stirring. To this slurry was added dropwise 32.7 ml (50 mmoles) of 1.52M ethylaluminum dichloride in hexane. The resultant light brown slurry was heated to reflux for a period of 30 minutes (1800 s) and cooled to room temperature. The Mg:Ti atomic ratio of the catalyst was 10:1, and the Cl:Mg ratio was 4:1. The ratio of epichlorohydrin (ECH):alkyl groups on magnesium was 1:1.

B. Polymerization of Ethylene

An aliquot of catalyst slurry, prepared in (A) above, containing 0.005 millimoles of titanium was added to a 1.8 liter stirred stainless steel reactor containing 1.0 liter of dry, oxygen free hexane and 1.09 ml of 0.921 molar (1.00 mmole) ATE (triethylaluminum) in hexane. The atomic ratio of Al:Ti was 200:1. The reactor nitrogen atmosphere was replaced with hydrogen by purging, the reactor contents were heated to 85° C., and the reactor pressure adjusted to 70 psig (482.6 kPa) with hydrogen. Ethylene was then added to maintain a reactor pressure of 170 psig (1172.1 kPa). After two hours (7200 s) at 85° C., the reactor contents were filtered and the polyethylene dried in a vacuum oven overnight at about 60° C. to yield 242 grams of polyethylene with a melt index of 9.01 and a bulk density of 22.1 lb/ft$^3$ (0.354 g/cc). The catalyst efficiency was 1,008,400 grams polyethylene per gram of titanium.

EXAMPLE 2

A. Catalyst Preparation

A catalyst was prepared by an identical procedure to that described in Example 1(A) except that 0.75 ml (2.5 millimoles) of tetraisopropoxytitanium was substituted for the titanium tetrachloride. The molar ratios of Mg:Ti, Cl:Mg, and ECH:R groups on magnesium were 10:1, 4:1, and 1:1, respectively.

B. Polymerization of Ethylene

The polymerization procedure of Example 1(B) was repeated using the catalyst described in Example 2(A). After drying, 180 grams of polyethylene was obtained with a melt index of 5.28 and a bulk density of 17.7 lb/ft$^3$ (0.284 g/cc). The catalyst efficiency was 750,000 grams polyethylene per gram titanium.

EXAMPLE 3

A. Catalyst Preparation

The preparation described in Example 1(A) was repeated except that 30.5 ml (25 mmoles) of 0.82 molar di-n-hexylmagnesium was substituted for butylethylmagnesium. The ratios of Mg:Ti, Cl:Mg, and ECH:R groups on magnesium were 10:1, 4:1, and 1:1, respectively.

B. Polymerization of Ethylene

The polymerization procedure of Example 1(B) was repeated using the above catalyst. After drying, 281 grams of polymer were obtained with melt index 10.5, and a bulk density of 22.3 lb/ft$^3$ (0.357 g/cc). The catalyst efficiency was 1,171,000 grams polyethylene per gram titanium.

EXAMPLE 4

A. Catalyst Preparation

The preparation described in Example 1(A) was repeated except that 50 ml (37.5 mmoles) of 0.75 molar ethylaluminum sesquichloride was substituted for ethylaluminum dichloride. The Mg:Ti, Cl: and ECH:R groups on magnesium ratios were 10:1, 4.5:1, and 1:1, respectively.

B. Polymerization of Ethylene

The polymerization procedure of Example 1(B) was repeated for this catalyst using 1.6 ml of 0.616M triisobutylaluminum (0.986 mmoles) as cocatalyst to provide an aluminum to titanium ratio of 200:1. After drying, 329 grams of polymer were obtained with melt index 4.4, and a bulk density of 24.2 lb/ft$^3$ (0.388 g/cc). The catalyst efficiency was 1,371,000 grams polyethylene per gram titanium.

EXAMPLE 5

A. Catalyst Preparation

To a solution of 39.2 ml (25 mmoles) of butylethylmagnesium in hexane, was slowly added 4.1 ml (52.5 mmoles) of epichlorohydrin with constant stirring. The resulting solution was allowed to cool to room temperature (25° C.) and 0.28 ml (2.5 mmoles) titanium tetrachloride added with stirring. Then 65.4 ml (100 mmoles) of a 1.53M solution of ethylaluminum dichloride were then slowly added to the stirred slurry. The resultant reddish brown slurry was divided into two portions, one of which (Catalyst A, Table I) was heated at reflux for about one hour (3600 s), the other portion (Catalyst B, Table I) was stirred for 2 hours (7200 s). The ratios of Mg:Ti, Cl:Mg, and ECH:R groups on magnesium were 10:1, 8:1, and 1:1, respectively.

B. Polymerization of Ethylene

The polymerization procedure of Example 1(B) was repeated using different cocatalysts. The catalyst and cocatalyst types and quantities along with the polymerization results are shown in Table I.

TABLE I

| Catalyst Number | Cocatalyst (mmoles) | Catalyst mmoles Ti | Al:Ti Ratio | Polyethylene g | Catalyst Efficiency g PE/g Ti | Melt Index I$_2$ | Bulk Density lb/ft$^3$ (g/cc) |
|---|---|---|---|---|---|---|---|
| A | ATB[1] (1.00) | 0.005 | 200:1 | 245 | 1,029,000 | 2.39 | 22.9 (0.367) |
| B | ATB (0.60) | 0.003 | 200:1 | 157 | 1,090,000 | 3.03 | 22.5 (0.360) |
| B | ADBO[2] (0.60) | 0.003 | 200:1 | 119 | 826,500 | 1.13 | 16.8 (0.269) |
| B | ADBO (1.80) | 0.003 | 600:1 | 146 | 993,000 | 0.85 | 19.4 (0.311) |
| B | TEACI[3] (1.00) | 0.0025 | 400:1 | 78 | 650,000 | 0.76 | 15.4 (0.247) |

[1]ATB = triisobutylaluminum
[2]ADBO = diisobutylaluminum oxide
[3]TEACI = tetraethylaluminum cyclohexylimide

EXAMPLE 6

A. Catalyst Preparation

Three catalysts were prepared in which the ratio of epichlorohydrin to alkyl groups on magnesium was increased to 1.5:1 from the 1:1 ratio utilized in Example 1(A). Epichlorohydrin (6 ml, 77.5 mmoles) was slowly added to a stirred solution of 0.637M butylethylmagnesium (39.2 ml, 25 mmoles) in hexane. After cooling to about 25° C., 0.28 ml (2.5 mmoles) of titanium tetrachloride was added to the solution. Ethylaluminum dichloride (1.53M in hexane) was then added to the resultant slurry. This addition was followed by either heat at reflux or stirring for several hours. Table II lists the exact quantities and conditions of the preparations.

TABLE II

| Catalyst Number | 1.53 M Ethylaluminum dichloride ml/mmole | Heat | Mg/Ti Ratio | Cl/Mg[1] Ratio | ECH:R[2] |
|---|---|---|---|---|---|
| 6-A | 32.7/50 | Yes | 10/1 | 4/1 | 1.5 |
| 6-B | 65.4/100 | Yes | 10/1 | 8/1 | 1.5 |
| 6-C | 65.4/100 | No | 10/1 | 8/1 | 1.5 |

[1]Cl from EADC
[2]Mole ratio of epichlorohydrin to alkyl groups on magnesium

B. Polymerization of Ethylene

The polymerization procedure of Example 1(B) was repeated using triisobutylaluminum or triethylaluminum as cocatalyst. The catalyst and cocatalyst quantities and the polymerization results are given in Table III.

TABLE III

| Catalyst Number | Catalyst mmoles Ti | Cocatalyst | Al:Ti Ratio | Polyethylene g | Catalyst Efficiency g PE/g Ti | Melt Index $I_2$ | Bulk Density lb/ft$^3$ (g/cc) |
|---|---|---|---|---|---|---|---|
| 6-A | 0.005 | ATE[1] | 200:1 | 71 | 295,000 | 4.45 | 18.5 (0.296) |
| 6-B | 0.004 | ATB[2] | 200:1 | 176 | 917,000 | 2.28 | 22.2 (0.356) |
| 6-B | 0.004 | ATE | 200:1 | 131 | 682,300 | 2.19 | 20.8 (0.333) |
| 6-C | 0.005 | ATB | 200:1 | 231 | 963,000 | 3.8 | 24.6 (0.394) |
| 6-C | 0.003 | ATE | 200:1 | 125 | 868,000 | 1.94 | 23.1 (0.370) |

[1]ATE = triethylaluminum
[2]ATB = triisobutylaluminum

EXAMPLE 7

A. Catalyst Preparation

To a 0.637 molar solution of butylethylmagnesium (39.2 ml, 25 mmoles) in hexane was added 2.0 ml (25 mmoles) of epichlorohydrin. The solution was allowed to cool to about 25° C. and 0.28 ml (2.5 mmoles) titanium tetrachloride added with stirring, followed by the dropwise addition of 32.7 ml of 1.53M ethylaluminum dichloride (50 mmoles) in hexane. The resulting slurry was split into two portions, one of which was heated 30 minutes (1800 s) at reflux and is designated Catalyst A in Table IV. The remaining portion was stirred for two hours (7200 s) at 25° C., and is designated Catalyst B in Table IV. The atomic ratios of Mg:Ti, Cl:Mg (from aluminum alkyl halide), and ECH:R groups on magnesium were 10:1, 4:1, and 0.5:1, respectively.

B. Polymerization of Ethylene

The polymerization procedure of Example 1(B) was repeated using 0.616 molar triisobutylaluminum as cocatalyst. The catalyst and cocatalyst quantities and polymerization results are given in Table IV.

TABLE IV

| Catalyst Number | Catalyst mmoles Ti | Cocatalyst ATB[1] mmoles Al | Polyethylene g | Catalyst Efficiency g PE/g Ti | Melt Index $I_2$ | Bulk Density lb/ft$^3$ (g/cc) |
|---|---|---|---|---|---|---|
| A | 0.005 | 1.0 | 179 | 745,000 | 3.9 | 22.7 (0.364) |
| B | 0.005 | 0.5 | 292 | 1,216,700 | 3.29 | 21.3 (0.341) |

[1]ATB = triisobutylaluminum

EXAMPLE 8

A. Catalyst Preparation

A catalyst was prepared by slowly adding 4.1 ml (52.5 mmole) of epichlorohydrin to a stirred solution of 39.2 ml (25 mmoles) of 0.637M butylethylmagnesium in hexane. After cooling to about 25° C., 0.56 ml (5.0 mmoles) of titanium tetrachloride was added to the solution followed by the dropwise addition of 100 ml of 0.75 M ethylaluminum sesquichloride (75 mmoles) in hexane, with stirring. The resultant reddish brown slurry was divided into two portions, one of which (Catalyst A) was heated for 30 minutes (1800 s) at reflux, the other (Catalyst B) was stirred for about one hour (3600 s). The atomic ratios of Mg:Ti, Cl(from aluminum):Mg, and ECH:R groups attached to Mg were 5:1, 9:1, and 1:1, respectively.

B. Polymerization of Ethylene

The polymerization procedure of Example 6(B) was repeated. The quantities of catalyst and cocatalyst and the results of the polymerization are given in Table V.

TABLE V

| Catalyst Number | Catalyst mmoles Ti | Cocatalyst ATB[1] mmoles Al | Polyethylene g | Catalyst Efficiency g PE/g Ti | Melt Index $I_2$ | Bulk Density lb/ft$^3$ (g/cc) |
|---|---|---|---|---|---|---|
| A | 0.0075 | 1.5 | 224 | 622,220 | 0.94 | 21.1 (0.338) |
| B | 0.005 | 1.0 | 174 | 725,000 | 0.81 | 16.8 (0.269) |

[1]ATB = triisobutylaluminum

EXAMPLE 9

A. Catalyst Preparation

The preparation described in Example 5(A) was repeated except that 57.5 ml (100 mmole) of 1.47 molar methylaluminum dichloride was substituted for the ethylaluminum dichloride used in Example 5(A). The catalyst slurry was split into two portions, one of which, designated Catalyst A in Table VI, was heated at reflux for 30 minutes (1800 s); the other portion, designated Catalyst B in Table VI, was stirred at about 25° C. for 2-3 hours (7200-10800 s). The atomic ratios of Mg:Ti, Cl:Mg (Cl from aluminum alkyl halide), and ECH:R groups attached to magnesium were 10:1, 8:1, and 1:1, respectively.

B. Polymerization of Ethylene

The polymerization procedure of Example 6(B) was repeated. The quantities of catalyst and cocatalyst and the results of the polymerization are given in Table VI.

TABLE VI

| Catalyst Number | Catalyst mmoles Ti | Cocatalyst | Al:Ti Ratio | Polyethylene g | Catalyst Efficiency g PE/g Ti | Melt Index $I_2$ | Bulk Density lb/ft$^3$ (g/cc) |
|---|---|---|---|---|---|---|---|
| 9-A | 0.005 | ATB[1] | 200:1 | 221 | 921,000 | 10.15 | 22.1 (0.354) |
| 9-A | 0.005 | ATE[2] | 200:1 | 207 | 863,000 | 13.0 | 22.4 (0.359) |
| 9-B | 0.005 | ATB | 200:1 | 112 | 466,000 | 3.93 | 19.1 (0.306) |
| 9-B | 0.005 | ATE | 200:1 | 172 | 717,000 | 8.6 | 21.4 (0.343) |

[1] ATB = triisobutylaluminum
[2] ATE = triethylaluminum

EXAMPLE 10

A. Catalyst Preparation

The catalyst preparation of Example 4(A) was repeated except that 0.24 ml (2.5 mmole) of vanadium oxytrichloride was substituted for titanium tetrachloride as transition metal source. The pale yellow catalyst slurry was divided into two portions, one of which, designated Catalyst A in Table VII, was heated at reflux for 1 hour (3600 s); the other, designated Catalyst B in Table VII, was stirred at about 25° C. for two hours (7200 s). The atomic ratios of Mg:V, Cl:Mg, and ECH:R groups on magnesium were 10:1, 2.25:1, and 1:1, respectively.

B. Polymerization of Ethylene

The polymerization procedure of Example 1(B) was repeated using 0.616 molar triisobutylaluminum as cocatalyst. The quantities of catalyst, cocatalyst (triisobutylaluminum) and hydrogen utilized, along with the results of the polymerizations, are given in Table VII.

TABLE VII

| Catalyst Number | Catalyst mmoles Ti | Al:Ti Ratio | H$_2$ psig (kPa) | Polyethylene g | Catalyst Efficiency g PE/g Ti | Melt Index $I_2$ | Bulk Density lb/ft$^3$ (g/cc) |
|---|---|---|---|---|---|---|---|
| 10-A | 0.05 | 20:1 | 10 (68.95) | 153 | 60,000 | 0.54 | 15.0 (0.240) |
| 10-A | 0.05 | 40:1 | 10 (68.95) | 225 | 88,250 | 1.1 | 20.0 (0.320) |
| 10-B | 0.02 | 20:1 | 10 (68.95) | 76 | 79,200 | 2.3 | 18.8 (0.301) |

EXAMPLE 11

A. Catalyst Preparation

Neat epichlorohydrin (4.1 ml, 52 mmoles) was slowly added to 39.2 ml (25 mmoles) of 0.637M butylethylmagnesium in n-hexane. Titanium tetrachloride (0.28 ml, 2.5 mmoles) was added to the resultant solution with continuous stirring. This was followed by the dropwise addition of 131 ml of 1.53M ethylaluminum dichloride (200 mmoles). The resultant slurry was divided into two portions, one of which designated Catalyst 11a was heated at the boiling point of hexane for 30 minutes (1800 s), the other portion, designated Catalyst 11b was stirred at about 25° C. for 2 hours (7200 s). The atomic ratios of Mg:Ti, Cl:Mg and ECH:R group on magnesium were 10:1, 16:1, and 1:1, respectively.

B. Polymerization of Ethylene

An aliquot of catalyst slurry, prepared in (A) above, containing 0.005 millimoles of titanium was added to a 1.8 l stirred stainless steel autoclave containing 1.0 l of dry, oxygen free hexane under N$_2$ atmosphere and 0.8 ml of 0.616M triisobutylaluminum to provide an atomic ratio of Al:Ti of 100:1. The reactor nitrogen atmosphere was replaced with hydrogen by purging, the reactor contents were heated to 85° C. and the reactor pressure adjusted to 70 psig (48.26 kPa) with hydrogen. Ethylene was then continuously added to maintain a reactor pressure of 170 psig (117.21 kPa). After two hours (7200 s), the reactor contents were filtered and the polyethylene dried overnight in a vacuum oven at about 60° C. The results of the polymerizations for the two catalysts is given in Table VIII.

TABLE VIII

| Catalyst Number | Polyethylene (g) | Catalyst Efficiency g Pe/g Ti | Melt Index $I_2$ | Bulk Density lb/ft$^3$ (g/cc) |
|---|---|---|---|---|
| 11a | 60.0 | 250,000 | 1.71 | 13.0 (0.208) |
| 11b | 26.0 | 108,300 | 1.39 | 10.8 |

TABLE VIII-continued

| Catalyst Number | Polyethylene (g) | Catalyst Efficiency g Pe/g Ti | Melt Index I$_2$ | Bulk Density lb/ft$^3$ (g/cc) |
| --- | --- | --- | --- | --- |
| | | | | (0.173) |

EXAMPLE 12

A. Catalyst Preparation

The catalyst was prepared by slowly adding neat epichlorohydrin to 39.2 ml (25 mmoles) of 0.637M butylethylmagnesium in n-hexane. To this solution was added 0.11 ml (1.0 mmoles) of titanium tetrachloride. This addition was followed by the dropwise addition of 65.4 ml (100 mmoles) of 1.53 molar ethylaluminum dichloride in n-hexane. The resultant slurry was stirred an additional two hours (7200 s) at about 25° C. The atomic ratios of Mg:Ti, Cl:Mg, and ECH:R groups on magnesium were 25:1, 8:1, and 1:1, respectively.

B. Polymerization of Ethylene

An aliquot of catalyst slurry, prepared in (A) above, containing 0.003 millimoles titanium was added to a 1.8 l stirred stainless steel autoclave containing 1.0 l of dry, oxygen free hexane under nitrogen atmosphere. To this was added 1.0 ml of 0.616M triisobutylaluminum in n-hexane to provide an atomic ratio of Al:Ti of 200:1. The reactor nitrogen atmosphere was replaced with hydrogen by purging, the reactor contents heated to 85° C. and the reactor pressure adjusted to 70 psig (482.64 kPa) with hydrogen. Ethylene was then continuously added to maintain a reactor pressure of 170 psig (1172.1 kPa). After two hours, the reactor contents were filtered and dried in a vacuum oven overnight at about 60° C., to yield 221 grams of polyethylene. The polymer so obtained had a melt index of 2.0 and a bulk density of 18.4 lb/ft$^3$ (0.295 g/cc). The catalyst efficiency was 1,535,000 grams polyethylene per gram titanium.

I claim:

1. A catalytic product resulting from admixing in an inert hydrocarbon diluent and in an atmosphere excludes moisture and oxygen
   (A) at least one hydrocarbon soluble organomagnesium material represented by the formula R$_2$Mg.xMeR'$_{x'}$ wherein each R is independently a hydrocarbyl group having from 1 to about 20 carbon atoms; each R' is independently a hydrogen, hydrocarbyl or hydrocarbyloxy group having from 1 to about 20 carbon atoms; Me is Al, Zn or B; x has a value from zero to 10 and is sufficient to render the organomagnesium component hydrocarbon soluble; and x' has a value equal to the valence of Me;
   (B) at least one epihalohydrin represented by the formula

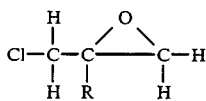

wherein R is hydrogen or an alkyl group having from 1 to about 10 carbon atoms;
   (C) at least one reducing halide source represented by the formulas Al(R$^3$)$_{3-m}$X$_m$ and B(R$^3$)$_{3-m}$X$_m$ including mixtures thereof wherein each R$^3$ is independently hydrogen or a hydrocarbyl group as above defined, and m has a value from 1 to 2; and
   (D) at least one transition metal (Tm) compound represented by the formula TmY$_n$X$_{z-n}$, wherein Tm is a transition metal in its highest stable valence state and being selected from groups IV-B, V-B and VI-B of the Periodic Table of the Elements; Y is oxygen, OR" or NR$_2$"; R" is hydrogen or a hydrocarbyl group having from 1 to about 20 carbon atoms; X is a halogen, preferably chlorine or bromine; z has a value corresponding to the valence of the transition metal, Tm; n has a value of from zero to 5 with the value of z−n being from zero up to a value equal to the valence state of the transition metal, Tm; and wherein
   (1) the components are added in the order (A), (B), (C) and (D) or (A), (B), (D) and (C);
   (2) the components are employed in quantities so as to provide the following atomic ratios
   Mg:Tm of from about 0.1:1 to about 100:1; Cl (from Component C):Mg of from about 2:1 to about 20:1; and
   the epoxide:total number of hydrocarbyl groups attached to a metal atom in component (A) is from about 0.5:1 to 2:1; and
   (3) the proviso that when the halide (from Component C):Mg atomic ratio is less than about 3:1 then the resultant mixture is heated at a temperature of from about 35° C. up to the boiling point of the inert hydrocarbon diluent, for a time to permit substantial reaction of the resultant mixture as indicated by a change in color of the mixture.

2. A catalytic product of claim 1 wherein
   (1) the atomic ratio of Mg;Tm is from about 1:1 to about 40:1;
   (2) the atomic ratio of Cl (from Component C):Mg is from about 3:1 to about 15:1; and
   (3) the ratio of epoxide groups in component (B):total number of hydrocarbyl groups attached to a metal atom in component (A) is from about 0.5:1 to about 1.5:1.

3. A catalytic product of claim 1 wherein
   (1) in component (A) each R and R' is a hydrocarbyl group having from 1 to about 10 carbons, Me is Al and x has a value of from about 0.2 to about 2;
   (2) in component (B) R is hydrogen;
   (3) component (C) is an aluminum alkyl halide wherein each R$^3$ is independently a hydrocarbyl group having from 1 to about 10 carbons and X is chlorine;
   (4) in component (D), Tm is titanium or vanadium;
   (5) the atomic ratio of Mg:Tm is from about 5:1 to about 20:1; and
   (6) the Cl (from Component C):Mg atomic ratio is from about 4:1 to about 12:1.

4. A catalytic product of claim 3 wherein
   (1) component (A) is butylethylmagnesium, di-n-hexylmagnesium;
   (2) component (B) is epichlorohydrin;
   (3) component (C) is ethylaluminum dichloride, ethylaluminum sesquichloride, methylaluminum dichloride; and
   (4) component (D) is titanium tetrachloride, tetraisopropoxytitanium and vanadium oxytrichloride.

* * * * *